US011734697B2

(12) United States Patent
Chavez et al.

(10) Patent No.: US 11,734,697 B2
(45) Date of Patent: Aug. 22, 2023

(54) DEVICE HANDOFF

(71) Applicant: Avaya Management L.P., Durham, NC (US)

(72) Inventors: David Chavez, Broomfield, CO (US); Kurt Haserodt, Westminster, CO (US); Valentine C. Matula, Granville, OH (US)

(73) Assignee: Avaya Management L.P., Durham, NC (US)

( * ) Notice: Subject to any disclaimer, the term of this patent is extended or adjusted under 35 U.S.C. 154(b) by 99 days.

(21) Appl. No.: 17/199,702

(22) Filed: Mar. 12, 2021

(65) Prior Publication Data

US 2022/0292520 A1 Sep. 15, 2022

(51) Int. Cl.
*G06Q 30/016* (2023.01)
*H04L 12/28* (2006.01)
*H04W 12/65* (2021.01)

(52) U.S. Cl.
CPC ....... *G06Q 30/016* (2013.01); *H04L 12/2809* (2013.01); *H04L 12/2816* (2013.01); *H04W 12/65* (2021.01)

(58) Field of Classification Search
CPC ........... H04L 12/2816; H04L 12/2809; H04W 12/65; G06Q 30/016
USPC ..................................................... 340/853.2
See application file for complete search history.

(56) References Cited

U.S. PATENT DOCUMENTS

| 9,560,531 | B1 | 1/2017 | Chang et al. |
| 10,848,567 | B1 | 11/2020 | Von Muenster et al. |
| 2012/0005390 | A1 | 1/2012 | Hoang |
| 2014/0092870 | A1 | 4/2014 | Ulupinar et al. |
| 2014/0129663 | A1 | 5/2014 | Landers et al. |
| 2015/0082081 | A1* | 3/2015 | Akirav ................ G06F 11/1612 |
| | | | 714/6.22 |
| 2018/0288179 | A1 | 10/2018 | Bhatia et al. |
| 2019/0141088 | A1 | 5/2019 | Morgan et al. |
| 2020/0065180 | A1* | 2/2020 | Cooper ............... G06F 11/0772 |

OTHER PUBLICATIONS

Official Action with English Translation for France Patent Application No. FR2201897, dated Oct. 11, 2022 11 pages.

* cited by examiner

*Primary Examiner* — Kam Wan Ma
(74) *Attorney, Agent, or Firm* — Sheridan Ross P.C.

(57) ABSTRACT

Devices are often connected to a network to facilitate remote interactions with the device. However, such connections may be absent or disabled. However, by utilizing a second device, such as a mobile phone, a transaction may be initiated on a remote device and handed-off to the second device to obtain absent information and complete the transaction. Completion of the transaction may be due to absent data, such as a data that provides absent information or resolves conflicting information in the dataset. The device may communicate with the second device via radio frequency communications and/or other forms of communication (e.g., visually, audibly, etc.), such that information the absent information is obtained and the instructions executed to complete the transaction.

20 Claims, 4 Drawing Sheets

DEVICE HANDOFF

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The invention relates generally to systems and methods for communicating between nodes on a network and particularly to multiple nodes communicating to execute a common set of instructions exchanged therebetween.

BACKGROUND

"Smart" appliances are often provided with functionality to diagnose and send data to a contact center for troubleshooting and repair. The contact center can call the owner of the smart appliances as needed, such as to reset the appliance or confirm normal operations. Certain smart appliances, such as televisions, are able to coordinate and communicate with applications of other devices, such as certain phones.

Despite these advantages, performing certain operations on devices require human interaction, such as by the customer with the smart appliance in their home or business. While certain operations are usually performed with little difficulty, such as turning a device on or off, other operations are may be more complicated, subjective, error-prone, or difficult to comprehend.

SUMMARY

As contact centers move more and more into the digital domain, the types of client experience include services that were not previously available, such as more device-specific services. As a result, more customization and targeted services may be provided to support device maintenance and servicing.

For example, a device may be a "dumb" device, that is, a device that is absent the components and logic required to connect to a remote server, such as to obtain maintenance. However, even when such devices that do comprise such functionality, their current state may make such functions inoperable. For example, a device that is powered off is incapable of networking to any device regardless of the features of the device or a fault may reside in the networking components.

These and other needs are addressed by the various embodiments and configurations of the present invention. The present invention can provide a number of advantages depending on the particular configuration. These and other advantages will be apparent from the disclosure of the invention(s) contained herein.

As a general introduction, and in one embodiment, systems and methods are provided to allow a target device to coordinate with a mobile device, such as to communicate information to and from a remote server and perform operations, either immediately or at a later time. The mobile device may obtain information from the target device in any manner for which the mobile device is configured. For example, a Bluetooth connection may be established with the device and provide two-way communications between the target device and the mobile device. Additionally, the mobile device may comprise a camera, such as to capture still or video images of the device and visual indicators of the device (e.g., status lights, gauges, dial positions, physical connections, infrared/thermal values, etc.), a microphone, such as to capture sound emitting from the device (e.g., status tones, unintended sounds, vibrations, etc.), accelerometers, such as to capture any movement or change in orientation of the target device or a portion thereof, etc. Additionally or alternatively, the mobile device may be configured, or paired with, other devices to enhance the operation of the mobile device (e.g., multi-meter, etc.).

In another embodiment, the mobile device may obtain content from the target device, such as contents of volatile memory before the target device is powered-down and/or previously executed diagnostic steps or configuration changes. As a benefit, the contact center may be provided with the content even when the target device is unable to communicate with the contact center.

In another embodiment, the target device and/or contact center may be enabled, via the mobile device, to perform additional operations. For example, a television that is performing abnormally may be the result of a defect in the signal presented to the television. Accordingly, the mobile device may sweep the nodes on a network (e.g., home or business network, devices served by a router or access point, etc.) and determine if any similar device are present. If found, the mobile device may provide subsequent information from the similar device and/or connect to the similar device and thereby enable the television and/or contact center to interact with the additional device. As a benefit, a problem that may, or may not, be rooted in the target device may be determined and addressed.

In another embodiment, diagnostic services provided by system of a contact center may be distributed between the target device, the mobile device, and/or the contact center. For example, a service provider providing streaming media content may utilize an avatar or other interface to a service application on the target device and/or the mobile device to perform some or all diagnostic and/or maintenance activities. The interface may have natural language processing (NPL) such as to receive textual or spoken input from a user, such as describing the problem and initiating the diagnostic and/or remediation of the problem described. As a benefit, interactive portions may avoid usage of the external network, such as to provide connection to a contact center, for some or all of the interaction. For example, there may be some basic operations (e.g., turn it off and on again, "what is the error code?" "Is the yellow light on?", etc.) that may be performed without encumbering the external network or networked resources. If contact center resources are needed, the prior interaction and/or information exchanged is provided to reduce the set of potential problems and their resolution and allow the subsequent actions to determine a more limited set of potential problems and select and implement a similarly more limited set of resolutions.

When a self-service operation has been initiated on the target device, but the options available exhausted without sufficient resolution, interaction with an agent (automated and/or human) of a contact center may require the use of a different device. For example, a device such as a television may be currently turned off, absent a microphone, or have a microphone but in a privacy-mode wherein the microphone is disabled due to a current privacy setting. As a result, two-way communication utilizing the target device as an endpoint may not be possible. For other less sophisticated devices (e.g., thermostat) interactive communications comprising user inputs and outpoints may not be possible if such interfaces are not present. An artificial intelligence (AI) agent may assist in determining information to obtain from the target device and/or at least a portion of the operations to perform or when to incorporate a remote resource (e.g., contact center) into the resolution process, such to prompt for the acquisition of data from other devices not available to the test device (e.g., "Is the television in the other room having the same issue?" "Have the settings on your router changed?").

In another embodiment, a cloud-based application may not need a mobile or "smarter" device. The application may generate a callback to the phone (smart device) as long as the devices have a path of connectivity to the cloud.

Exemplary aspects are directed to:

A system, comprising:
a network interface to a network;
a processor comprising machine-readable instructions maintained in a non-transitory memory that when read by the processor cause the processor to perform:
selecting a transaction to perform on a first device, wherein the transaction comprises processing a dataset in accordance with a set of instructions;
conducting a first communication, via the network, with a first device and obtaining from the first communication a dataset;
determining whether the dataset is complete;
upon determining the dataset is complete, processing the dataset; and
upon determining the dataset is not complete, conducting a second communication with a second device, wherein the set of instructions and the dataset are provided to the second device, wherein the first device and the second device communicate via a third communication that omits the processor to obtain a supplemental dataset that, when combined with the data set, completes the dataset and second device executes the set of instructions to perform the transaction on the first device.

A system, comprising:
a network interface to a network;
a processor comprising machine-readable instructions maintained in a non-transitory memory that when read by the processor cause the processor to perform:
receiving, in a first communication via the network from a second device, a dataset with a set of instructions that when executed complete a transaction on a third device, wherein a datum is required to execute the set of instructions and complete the transaction and wherein the datum is absent from the dataset;
conducting a second communication with the third device, wherein the second communication excludes the second device;
obtaining, via the second communication, a supplemental dataset that comprises the datum and completes the dataset;
executing the set of instructions on the dataset, combined with the supplemental dataset, to complete the transaction on the first device.

A method, comprising:
selecting a transaction to perform on a first device, wherein the transaction comprises processing a dataset in accordance with a set of instructions;
conducting a first communication, via a network, with a first device and obtaining from the first communication a dataset;
determining whether the dataset is complete;
upon determining the dataset is complete, processing the dataset; and
upon determining the dataset is not complete, conducting a second communication with a second device, and providing the set of instructions and the dataset are provided to the second device, wherein the first device and the second device communicate via a third communication that omits the network to obtain a supplemental dataset that, when combined with the dataset, completes the dataset and second device executes the set of instructions to perform the transaction on the first device.

Any of the above aspects:
wherein the second communication comprises an address on the network that, when read by a processor of the second device, provides the set of instructions and the dataset are provided to the second device;
wherein the third communication comprises visual information captured by a camera image of the first device and obtaining the supplemental dataset from the camera image;
wherein the third communication comprises sound captured by a microphone of the first device and wherein the supplemental dataset is obtained from the sound;
wherein the third communication comprises one of a set of radio frequency communication types and wherein the second device iterates through the set of radio frequency communication types and wherein the supplemental dataset is obtained through a selected one of the set of radio frequency communication types;
wherein at least one of the first device or the second device performs the transaction comprising steps determined by an artificial intelligence;
wherein determining the dataset is complete further comprises determining whether at least one operation of set of instructions is required to perform the transaction and the at least operation requires a datum absent from the dataset;
wherein the set of instructions and the dataset are provided to the second device to omit at least one instruction of the set of instructions executed by the first device;
wherein the set of instructions and the dataset are provided to the second device to comprise at least one value in the dataset determined by the first device executing the set of instructions;
wherein the transaction comprises one or more of a diagnostic operation, altering a stored data value, altering at least one instruction for execution by a processor of the first device, executing a function, or disabling a function;
wherein receiving the dataset with the set of instructions comprises receiving an address on the network and further comprising accessing the address on the network to obtain the set of instructions and the dataset;
further comprising: a camera configured to capture a camera image and provide the camera image to the processor; and wherein the second communication comprises captured visual information of the first device; and wherein the processor obtains the supplemental dataset from the camera image;
further comprising: a camera configured to capture sound and provide the sound to the processor; and wherein the second communication comprises sound of the first device; and wherein the processor obtains the supplemental dataset from the sound;

wherein the second communication comprises one of a set of radio frequency communication types and wherein the processor iterates through the set of radio frequency communication types and wherein the supplemental dataset is obtained through a selected one of the set of radio frequency communication types;

wherein the transaction comprises one or more of a diagnostic operation, altering a stored data value, altering at least one instruction for execution by a processor of the first device, executing a function, or disabling a function;

wherein determining the dataset is complete further comprises determining whether at least one operation of the set of instructions is required to perform the transaction and the at least operation requires a datum that is absent from the dataset;

wherein providing the set of instructions and the dataset further comprises providing the set of instructions and the dataset to the second device to omit at least one instruction of the set of instructions executed by the first device;

wherein providing the set of instructions and the dataset further comprises providing the dataset to comprise at least one value in the dataset previously determined by the first device executing the set of instructions.

A system on a chip (SoC) including any one or more of the above aspects of the embodiments described herein.

One or more means for performing any one or more of the above aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with a like reference number. When such a reference is made in the singular form, but without identification of the sub-reference identifier, is a reference one of the like numbered elements, but without limitation as to the particular one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
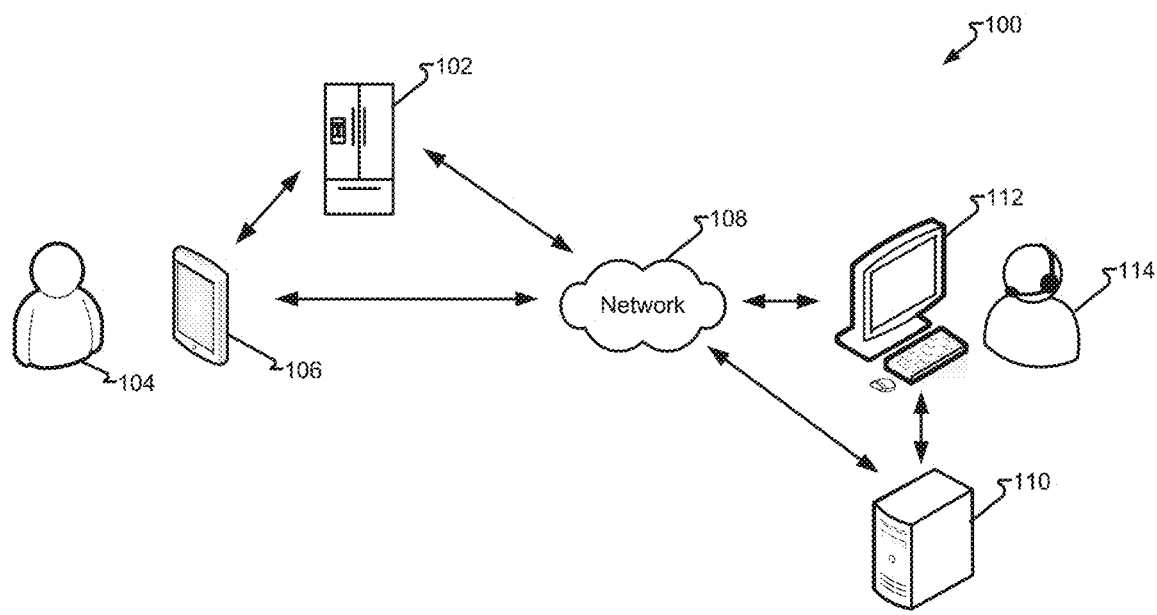
FIG. 1 depicts a first system in accordance with embodiments of the present disclosure.

FIG. 1 depicts system 100 in accordance with embodiments of the present disclosure. In one embodiment, target device 102 is the subject of a transaction. Target device 102 is illustrated herein as a refrigerator without limitation. Accordingly, target device 102 may be embodied as any electronic or electro-mechanical device comprising, at least, the ability to receive instructions from user device 106 and/or server 110 utilized by user 104. The transaction comprises performing an operation or altering an operational features of target device 102. For example, the transaction may comprise performing an update, diagnosing a problem, changing an operational feature, enabling or disabling a function, and/or other transaction comprising the exchange of data to and/or from target device 102. The transaction may further comprise applying a change to a setting, such as may be determined by a datum held in memory or other data storage of target device 102, and/or an operational feature, such as to load and execute a software update, new feature, and/or diagnostic instructions.

Target device 102 may be embodied as a device that is enabled to communicate via network 108, which comprises, at least in part, a public network (e.g., Internet), which are commonly referred to as "smart" devices. Such devices are capable of accessing external resources, such as server 110 and/or agent device 112 operated by agent 114, such as to report error codes, obtain software updates, and other tasks. Often such devices are in a state where such communications are disabled or inoperable. Additionally, target device 102 may be embodied as a "dumb" device, wherein communication directly between target device 102 and a remote device, such as server 110 and/or agent device 112 is impossible due to an absence of the required circuitry and/or other features to enable such communications.

User device 106, such as a mobile phone, tablet, laptop, or other device, may comprise a network interface to communicate with remote devices, such as one or more of agent device 112 and/or server 110. Additionally, user device 106 comprises one or more features wherein simplex or duplex communications, which may comprise full or half duplex, may be established between user device 106 and target device 102. Accordingly, target device 102 may obtain services, such as a transaction, from server 110 when at least a portion of the transaction is performed by user device 106.

In one embodiment, target device 102 is in communication with server 110 for a transaction, such as to obtain diagnostic services. Server 110, alone or with benefit of agent device 112 and agent 114, may determine that a datum is absent and the transaction cannot be completed. The datum may be required to provide, confirm, or contradict other information that may be obtained regarding target device 102. When target device 102 is embodied as a refrigerator, a dataset provided by target device 102 to server 110 via network 108 may comprise data indicating the temperature of the refrigerated portion is thirty-six degrees Fahrenheit, an intended value. However, another datum indicates that the freezer portion of target device 102 is at seventy degrees Fahrenheit, an unexpected value for a refrigerator that is operating with a refrigerated portion at the intended setting. As a result, a transaction selected to resolve an operational anomaly of the refrigerator may not be able to be completed due to the ambiguity between the two temperature data as reported by target device 102 to server 110.

User device 106 may be provided with a set of instructions and/or the dataset, such as to cause user device 106 to execute the set of instructions to obtain a datum from target device 102 which does not utilize server 110 or agent device 112 and agent 114. For example, user device 106 may comprise a camera with thermal imaging capabilities and determine an observed temperature of the freezer portion and/or the refrigerator portion. As a result, a datum may be obtained that confirms the temperatures do comport with the temperature data reported in the dataset, indicating one set of issues to resolve, or at least one temperature value reported is erroneous, indicating a second set of issues to resolve. With the data, user device 106 may execute the instructions to perform the transaction to provide a determined resolution to target device 102.

In other embodiments, user device 106 may communicate with target device 102 utilizing a camera of user device 106 to obtain information from target device 102 within the visual spectrum. For example, target device 102 may be embodied as a television which is indicating, in a value in a dataset, that target device 102 is operating in a particular mode (e.g., 1080p, 4K, 8K, etc.) but observed to be operating in a mode inconsistent with the indicated mode. Target device 102 may provide a dataset to server 110 indicating the current operational mode. Server 110 and/or agent device 112 may provide the dataset to user device 106 along with an instruction set to execute on target device 102 such as to observe the display of target device 102 and obtain an observed datum to use to complete the transaction, such as to diagnose and/or apply a remedy to target device 102.

In other embodiments, visual information may be captured in from visual indicators (e.g., status lights, dial positions, gauges, ports with and/or without connecting cables, etc.). In other embodiments, sound information may be obtained from target device 102 and the datum required to complete the transaction obtained from the datum. For example, target device 102 may be making an unintended noise (e.g., vibration, bearing "squeal", motor running although reported as not running, etc.). Additionally, as introduced above, target device 102 may not be able to communicate directly with server 110 and/or agent device 112 over network 108 due to an absence of such functionality or a current configuration that has disabled such communications. Accordingly, target device 102 may communicate with user device 106 via visual, audio, and/or radio frequency communications. For example, target device 102 may comprise Bluetooth, near field radio communications (NFC), and/or other radio frequency communications. User device 106 may select an operable mode of communication through an interaction. For example, to attempt to communicate with target device 102 via Bluetooth and doing so if successful, if not proceeding to the next type of communication, such as NFC, then visual, then audio. It should be appreciated that the actual sequence of communication types selected may be varied without departing from the scope of the embodiments provided herein.

Providing the dataset from target device 102 to agent device 112, server 110, and/or user device 106 may comprise direct communication, wherein no other component is utilized for the communication other than components utilized to support all communications for a particular segment of a network and excludes devices that are specifically configured to receive the communications comprising the dataset, such as to hold the dataset for subsequent retransmission. In another embodiment, the dataset may be collected, in whole or in part, by a relaying device which may receive the dataset at one time and then provide the dataset to at least one of agent device 112, server 110, and/or user device 106 at a subsequent time. For example, target device 102 may write a dataset to a cloud server (not shown), a data storage portion of user device 106, server 110, and/or other networked storage device. As a benefit, target device 102 may be entirely disabled or disabled for purposes of communicating the dataset for performance, at least in part, of the transaction.

Server 110 may execute an instruction set utilizing the dataset from target device 102 to perform the selected transaction. However, due to the absence of a datum (or plurality thereof), the transaction cannot be completed. In another embodiment, server 110 provides user device 106 with the dataset and the set of instructions necessary to complete the transaction on target device 102. User device 106 then executes the set of instructions, such as to cause user device 106 to obtain the datum, and then use the datum according to the set of instructions to complete the transaction on target device 102. The dataset and the set of instructions may be the same or different from the set of instructions executed by server 110, such as when a portion of the set of instructions has been successfully executed and thereby providing a different portion of the set of instructions not yet successfully executed to user device 106. Similarly, the dataset may be altered such as to exclude portions already utilized by the set of instructions successfully, and/or include the results from a portion of the set of instructions. Additionally or alternatively, server 110 may provide to user device 106 one or more of the dataset and/or set of instructions by providing an indica of an address on a network (e.g., URL, FTP site, etc.), such that user device 106, upon obtaining the indicia subsequent obtains the dataset and/or set of instructions from the location. The set of instructions may comprise an artificial intelligent agent, such as to obtain a datum that is not determined at the time of execution of the set of instructions, and determine a response thereto.

It should be appreciated that other communications, such as between user device 106, server 110, agent device 112 and agent 114 may be provided, such as to communicate status and/or other information.

Figure 2:
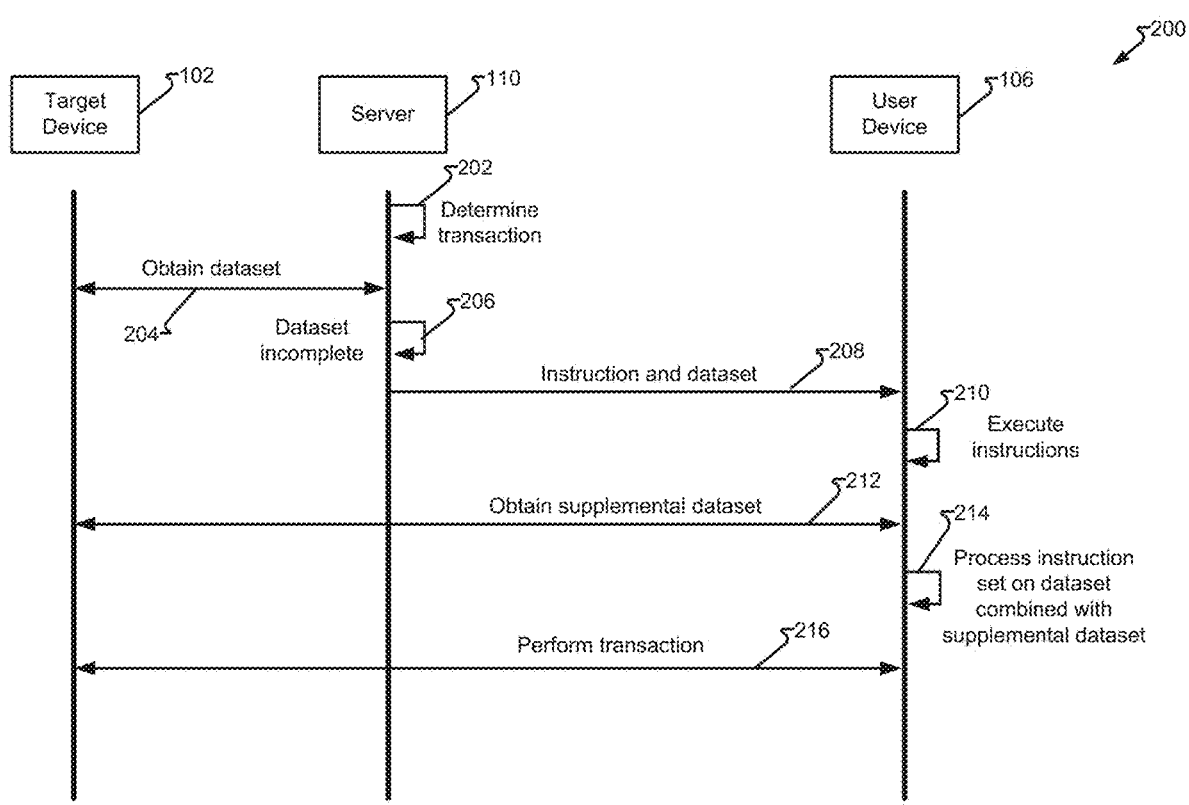
FIG. 2 depicts a first interaction in accordance with embodiments of the present disclosure.

FIG. 2 depicts interaction 200 in accordance with embodiments of the present disclosure. In one embodiment, server 110 determines a transaction in step 202. Step 202 may be initiated autonomously and without human action, such as when a transaction is previously determined, such as a periodic assessment, upgrade, maintenance, etc. In another embodiment, step 202 may be initiated from another source, such as target device 102 or user device 106 reporting a particular issue to agent device 112 and/or server 110.

Interaction 204 obtains a dataset from target device 102. In other embodiments, interaction 204 obtains the dataset from target device 102 from another device that has previously received the dataset, such as user device 106 and/or other device. The dataset comprising operational settings, observed conditions, history of operations, memory contents, attributes, and/or other data or combination thereof. Server 110 performs interaction 206 to determine if the dataset is complete in order to perform the selected transaction and, if so, performs the transaction wherein interaction 200 may be terminated. Otherwise, interaction 206 determines the dataset is incomplete in order to compete the transaction, due to an absent datum. In response, interaction 208 provides the set of instructions and the dataset to user device 106 and, in step 210, user device 106 executes at least a portion of the set of instructions.

At least one of the instructions user device 106 to communicate with target device 102 to obtain a supplemental dataset in interaction 212. As described above, the communication may comprise radio frequency, optical (visual, infrared, etc.), audio, motion (e.g., vibration, motion, etc.), communications. Step 214 executes the set of instructions with the dataset and supplemental dataset comprising the datum determined to be absent in interaction 206, and perform the transaction in step 216.

Figure 3:
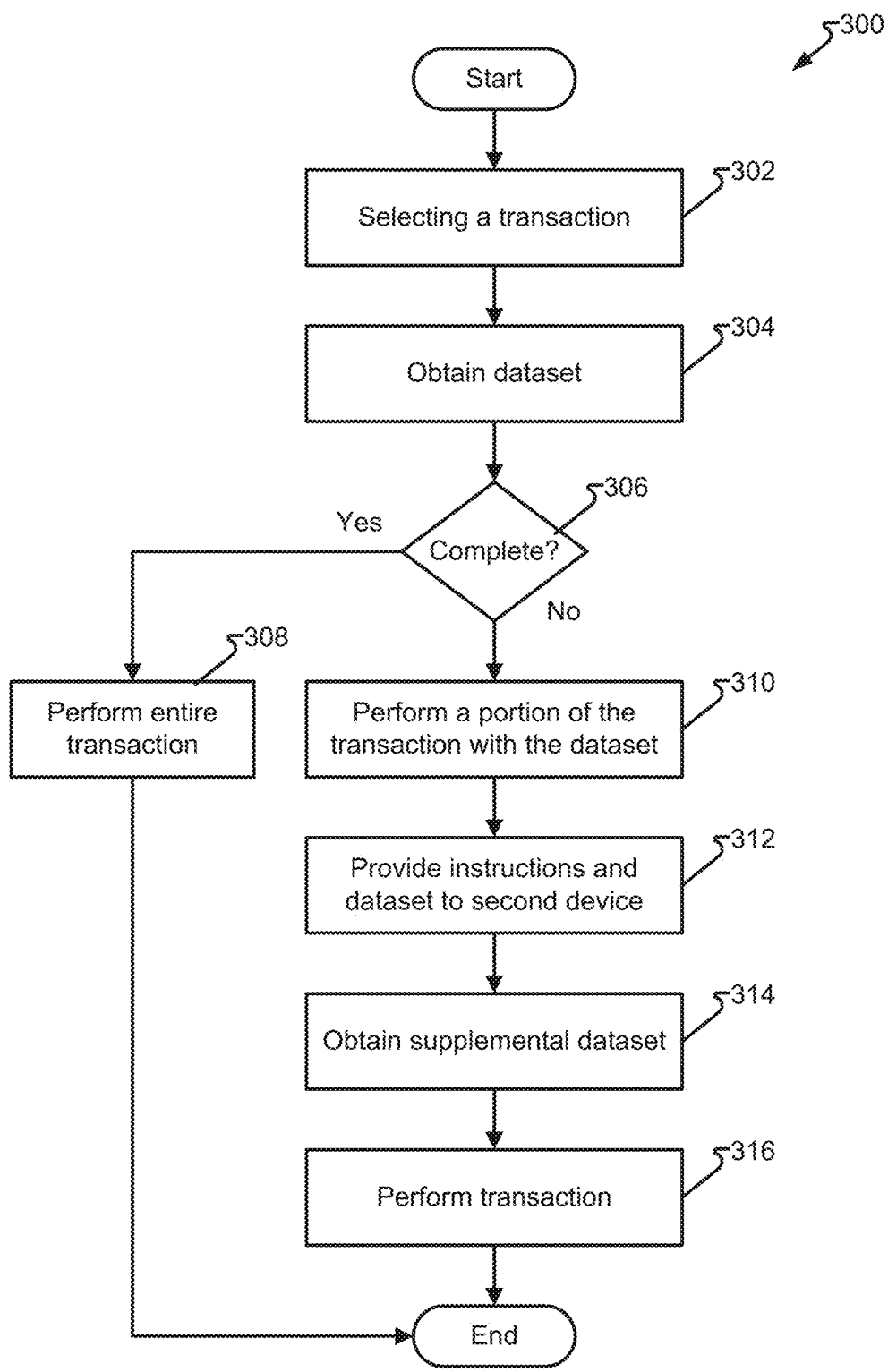
FIG. 3 depicts a process in accordance with embodiments of the present disclosure.

FIG. 3 depicts process 300 in accordance with embodiments of the present disclosure. In one embodiment, process 300 is embodied as machine-readable instructions that when read by a machine, such as at least one processor of server 110 and/or user device 106, cause the at least one processor to perform the steps of process 300. Process 300 begins and step 302 selects a transaction. Step 302 may comprise an explicit request, such as for an upgrade or reported error state of a first device, such as target device 102.

Step 304 obtains a dataset comprising at least one datum regarding the first device. However, test 306 determines whether the dataset is or is not complete, such as if a required datum necessary for the performance of the transaction selected in step 302 is absent. Accordingly, if test 306 is determined in the affirmative, processing continues to step 308 wherein the transaction is performed. If test 306 is determined in the negative, processing continues to step 310. Step 310 may perform a portion of the transaction by executing some, but not all, of a set of instructions, wherein the instructions not executed are excluded from execution due to the absence of the datum.

Step 312 provides the set of instructions, or an unexecuted portion thereof, and the dataset to a second device, such as user device 106. Step 312 may package the set of instructions and dataset into a package and/or data format (e.g., ZIP, XML, custom, etc.). As a result of step 310, the dataset may be modified to include additional, fewer, and/or different values therein. Similarly, the set of instructions may also include additional, few, and/or different instructions therein due to the portion of the set of instructions executed in step 310.

Step 314 obtains a supplemental dataset, to comprise the absent datum, such as by establishing a communication between user device 106 and target device 102 in one or more of radio frequency, visual, audio, and/or motion communication types. Step 316 then executes the set of instructions on the dataset, combined with the supplemental dataset, to complete the transaction.

Figure 4:
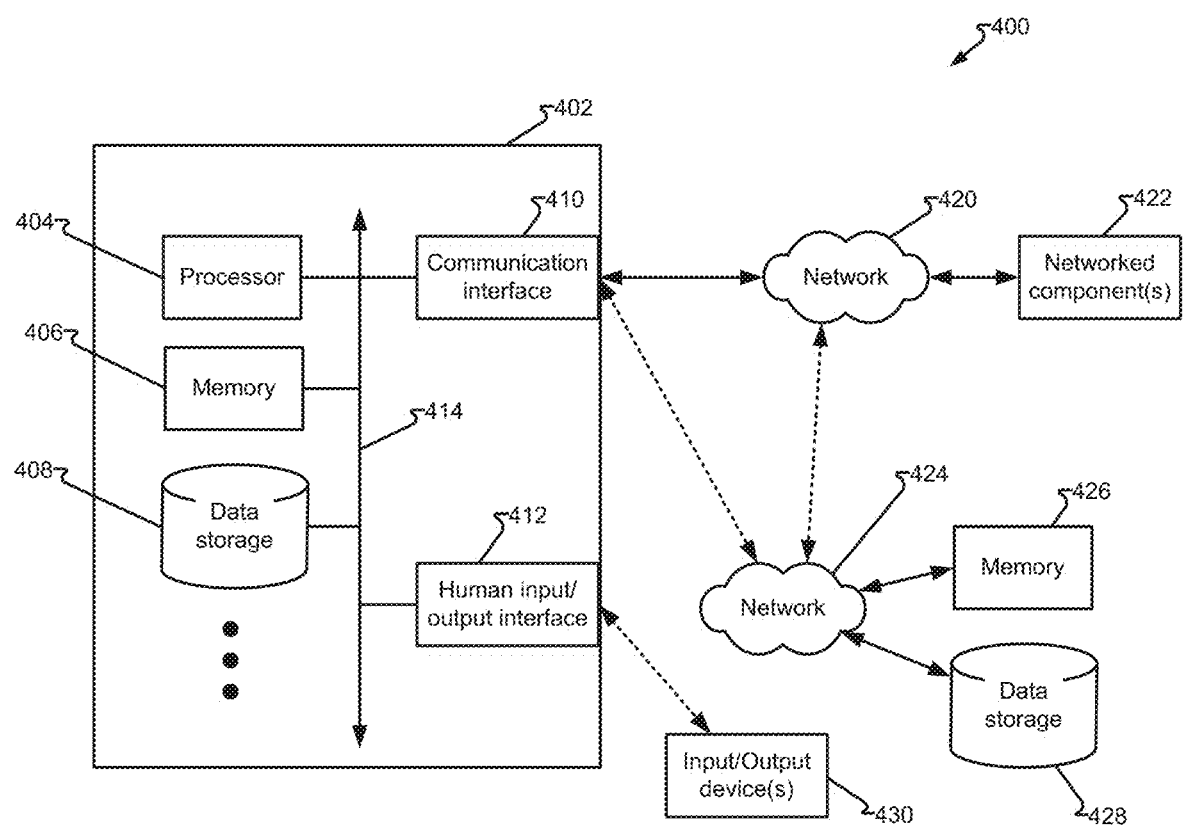
FIG. 4 depicts a second system in accordance with embodiments of the present disclosure.

FIG. 4 depicts device 402 in system 400 in accordance with embodiments of the present disclosure. In various embodiment, combinations of one or more of user device 106, target device 102, server 110, agent device 112, may be embodied, in whole or in part, as device 402 comprising various components and connections to other components and/or systems. The components are variously embodied and may comprise processor 404. The term "processor," as used herein, refers exclusively to electronic hardware components comprising electrical circuitry with connections (e.g., pin-outs) to convey encoded electrical signals to and from the electrical circuitry. Processor 404 may be further embodied as a single electronic microprocessor or multi-processor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 414, executes instructions, and outputs data, again such as via bus 414. In other embodiments, processor 404 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 404 is a non-transitory computing device (e.g., electronic machine comprising circuitry and connections to communicate with other components and devices). Processor 404 may operate a virtual processor, such as to process machine instructions not native to the processor (e.g., translate the VAX operating system and VAX machine instruction code set into Intel® 9xx chipset code to allow VAX-specific applications to execute on a virtual VAX processor), however, as those of ordinary skill understand, such virtual processors are applications executed by hardware, more specifically, the underlying electrical circuitry and other hardware of the processor (e.g., processor 404). Processor 404 may be executed by virtual processors, such as when applications (i.e., Pod) are orchestrated by Kubernetes. Virtual processors allow an application to be presented with what appears to be a static and/or dedicated processor executing the instructions of the application, while underlying non-virtual processor(s) are executing the instructions and may be dynamic and/or split among a number of processors.

In addition to the components of processor 404, device 402 may utilize memory 406 and/or data storage 408 for the storage of accessible data, such as instructions, values, etc. Communication interface 410 facilitates communication with components, such as processor 404 via bus 414 with components not accessible via bus 414. Communication interface 410 may be embodied as a network port, card, cable, or other configured hardware device. Additionally or alternatively, human input/output interface 412 connects to one or more interface components to receive and/or present information (e.g., instructions, data, values, etc.) to and/or from a human and/or electronic device. Examples of input/output devices 430 that may be connected to input/output interface include, but are not limited to, keyboard, mouse, trackball, printers, displays, sensor, switch, relay, speaker, microphone, still and/or video camera, etc. In another embodiment, communication interface 410 may comprise, or be comprised by, human input/output interface 412. Communication interface 410 may be configured to communicate directly with a networked component or utilize one or more networks, such as network 420 and/or network 424.

Network 108 may be embodied, in whole or in part, as network 420. Network 420 may be a wired network (e.g., Ethernet), wireless (e.g., WiFi, Bluetooth, cellular, etc.) network, or combination thereof and enable device 402 to communicate with networked component(s) 422. In other embodiments, network 420 may be embodied, in whole or in part, as a telephony network (e.g., public switched telephone network (PSTN), private branch exchange (PBX), cellular telephony network, etc.).

Additionally or alternatively, one or more other networks may be utilized. For example, network 424 may represent a second network, which may facilitate communication with components utilized by device 402. For example, network 424 may be an internal network to a business entity or other organization, whereby components are trusted (or at least more so) that networked components 422, which may be connected to network 420 comprising a public network (e.g., Internet) that may not be as trusted. For example, and in one embodiment, user device 106 may be embodied as device 402 in communication with target device 102 via network 424 which may exclude network 420 entirely or public portions thereof (e.g., Internet).

Components attached to network 424 may include memory 426, data storage 428, input/output device(s) 430, and/or other components that may be accessible to processor 404. For example, memory 426 and/or data storage 428 may supplement or supplant memory 406 and/or data storage 408 entirely or for a particular task or purpose. For example, memory 426 and/or data storage 428 may be an external data repository (e.g., server farm, array, "cloud," etc.) and allow device 402, and/or other devices, to access data thereon. Similarly, input/output device(s) 430 may be accessed by processor 404 via human input/output interface 412 and/or via communication interface 410 either directly, via network 424, via network 420 alone (not shown), or via networks 424 and 420. Each of memory 406, data storage 408, memory 426, data storage 428 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 430 may be a router, switch, port, or other communication component such that a particular output of processor 404 enables (or disables) input/output device 430, which may be associated with network 420 and/or network 424, to allow (or disallow) communications between two or more nodes on network 420 and/or network 424. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits. Additionally or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™ M microprocessors, ARM® Cortex-A and ARM1926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A system, comprising:
    a network interface coupled to a network; and
    a processor comprising machine-readable instructions maintained in a non-transitory memory that when read by the processor cause the processor to perform:
        selecting a transaction to perform on a first device, wherein the transaction comprises processing a dataset in accordance with a set of instructions;
        conducting a first communication, via the network, with the first device and obtaining the dataset during the first communication;
        determining whether the dataset is complete;
        upon determining that the dataset is complete, processing the dataset; and
        upon determining that the dataset is not complete, conducting a second communication with a second device, wherein the set of instructions and the dataset are provided to the second device, and wherein the first device and the second device communicate via a third communication that omits the processor to obtain a supplemental dataset that, when combined with the data set, completes the dataset and the second device executes the set of instructions to perform the transaction on the first device.

2. The system of claim 1, wherein the second communication comprises an address on the network that, when read by a processor of the second device, provides the set of instructions and the dataset that are provided to the second device.

3. The system of claim 1, wherein the third communication comprises visual information captured by a camera of the first device and obtains the supplemental dataset from the camera.

4. The system of claim 1, wherein the third communication comprises sound captured by a microphone of the first device and wherein the supplemental dataset is obtained from the sound.

5. The system of claim 1, wherein the third communication comprises one of a set of radio frequency communication types, wherein the second device iterates through the set of radio frequency communication types and wherein the supplemental dataset is obtained through a selected one of the set of radio frequency communication types.

6. The system of claim 1, wherein the first device performs the transaction comprising steps determined by an artificial intelligence.

7. The system of claim 1, wherein determining the dataset is complete further comprises determining whether a datum is required by at least one operation of the set of instructions in order to perform the transaction and whether the datum is absent or present in the dataset and further comprises determining the dataset is complete upon determining the datum is present in the dataset.

8. The system of claim 1, wherein the set of instructions and the dataset are provided to the second device to omit at least one instruction of the set of instructions executed by the first device.

9. The system of claim 1, wherein the set of instructions and the dataset that are provided to the second device comprise at least one value in the dataset determined by the first device executing the set of instructions.

10. The system of claim 1, wherein the transaction performed on the first device comprises one or more of a diagnostic operation, altering a stored data value, altering at least one instruction for execution by a processor of the first device, executing a function, or disabling a function.

11. A system, comprising:
    a network interface coupled to a network; and
    a processor comprising machine-readable instructions maintained in a non-transitory memory that when read by the processor cause the processor to perform:
        receiving, in a first communication via the network from a second device, a dataset with a set of instructions that, when executed, complete a transaction on a third device, wherein a datum is required to execute the set of instructions and complete the transaction, and wherein the datum is absent from the dataset;

conducting a second communication with the third device, wherein the second communication excludes the second device;

obtaining, via the second communication, a supplemental dataset that comprises the datum and completes the dataset; and executing the set of instructions on the dataset, combined with the supplemental dataset, to complete the transaction on the third device.

12. The system of claim 11, wherein receiving the dataset with the set of instructions comprises receiving an address on the network and further comprises accessing the address on the network to obtain the set of instructions and the dataset.

13. The system of claim 11, further comprising:
a camera configured to capture an image of a first device and provide the image to the processor; and
wherein the second communication comprises captured visual information of the first device; and
wherein the processor obtains the supplemental dataset from the image captured by the camera.

14. The system of claim 11, further comprising:
a microphone configured to capture sound and provide the sound to the processor; and
wherein the second communication comprises sound of a first device; and
wherein the processor obtains the supplemental dataset from the captured sound.

15. The system of claim 11, wherein the second communication comprises one of a set of radio frequency communication types, wherein the processor iterates through the set of radio frequency communication types, and wherein the supplemental dataset is obtained through a selected one of the set of radio frequency communication types.

16. The system of claim 11, wherein the transaction performed on the third device comprises one or more of a diagnostic operation, altering a stored data value, altering at least one instruction for execution by a processor of the third device, executing a function, or disabling a function.

17. A method, comprising:
selecting a transaction to perform on a first device, wherein the transaction comprises processing a dataset in accordance with a set of instructions;
conducting a first communication, via a network, with a first device and obtaining the dataset during the first communication;
determining whether the dataset is complete;
upon determining that the dataset is complete, processing the dataset; and
upon determining that the dataset is not complete, conducting a second communication with a second device, and providing the set of instructions and the dataset to the second device, wherein the first device and the second device communicate via a third communication that omits the network to obtain a supplemental dataset that, when combined with the dataset, completes the dataset and the second device executes the set of instructions to perform the transaction on the first device.

18. The method of claim 17, wherein determining the dataset is complete further comprises determining whether at least one operation of the set of instructions is required to perform the transaction and the at least one operation requires a datum that is absent from the dataset.

19. The method of claim 17, wherein providing the set of instructions and the dataset further comprises providing the set of instructions and the dataset to the second device to omit at least one instruction of the set of instructions executed by the first device.

20. The method of claim 17, wherein providing the set of instructions and the dataset further comprises providing the dataset comprising at least one value in the dataset previously determined by the first device executing the set of instructions.

* * * * *